(12) United States Patent
Bozionek

(10) Patent No.: US 8,060,110 B2
(45) Date of Patent: Nov. 15, 2011

(54) METHOD FOR LOCALIZING MOBILE TERMINALS

(75) Inventor: Bruno Bozionek, Borchen (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 646 days.

(21) Appl. No.: 11/988,606

(22) PCT Filed: Jul. 4, 2006

(86) PCT No.: PCT/EP2006/063861
§ 371 (c)(1),
(2), (4) Date: Jan. 11, 2008

(87) PCT Pub. No.: WO2007/012549
PCT Pub. Date: Feb. 1, 2007

(65) Prior Publication Data
US 2009/0075670 A1    Mar. 19, 2009

(30) Foreign Application Priority Data

Jul. 29, 2005   (DE) .......................... 10 2005 035 748

(51) Int. Cl.
*H04W 24/00* (2009.01)
(52) U.S. Cl. .................................................. 455/456.1
(58) Field of Classification Search .................. 455/435, 455/456.1–456.6, 524, 441, 445, 453, 422.1, 455/436
See application file for complete search history.

(56) References Cited

U.S. PATENT DOCUMENTS

| | | | | |
|---|---|---|---|---|
| 6,085,091 A * | 7/2000 | Yoo et al. | ...................... | 455/441 |
| 6,134,446 A | 10/2000 | Sasuta et al. | | |
| 6,810,325 B2 * | 10/2004 | Amano et al. | ................ | 701/207 |
| 7,751,825 B2 * | 7/2010 | Gogic | ......................... | 455/456.1 |
| 2001/0016500 A1 * | 8/2001 | Son et al. | ....................... | 455/456 |
| 2001/0034239 A1 * | 10/2001 | Yamato et al. | ................ | 455/456 |
| 2001/0044312 A1 * | 11/2001 | Yamane | ........................ | 455/456 |
| 2003/0027574 A1 * | 2/2003 | Watanabe et al. | ............. | 455/435 |

FOREIGN PATENT DOCUMENTS

| | | | |
|---|---|---|---|
| EP | 1 365 612 A1 | 11/2003 | |
| EP | 1 418 783 A1 | 5/2004 | |

* cited by examiner

*Primary Examiner* — Melody Mehrpour

(57) ABSTRACT

The geographical position, or measured information from which the geographical position may be deduced, of a mobile terminal is determined via requests to the terminal and positional information or measured information transmitted to a control device. The speed of displacement of the mobile terminal is determined from the transmitted positional information or measured information and the frequency of requests controlled depending on the determined speed of displacement of the mobile terminal. The communication exchange, in particular, for mobile terminals with low speeds of displacement is therefore significantly reduced and the mobile terminals and central devices provided with dynamic load reduction.

20 Claims, 1 Drawing Sheet

METHOD FOR LOCALIZING MOBILE TERMINALS

CROSS REFERENCE TO RELATED APPLICATIONS

This application is the US National Stage of International Application No. PCT/EP2006/063861, filed Jul. 4, 2006 and claims the benefit thereof. The International Application claims the benefits of German application No. 102005035748.2 DE filed Jul. 29, 2005, both of the applications are incorporated by reference herein in their entirety.

FIELD OF INVENTION

The present invention relates to localizing mobile terminals.

BACKGROUND OF INVENTION

In location/position based applications, e.g. conference management or communication management for hotels, it is necessary to determine the geographical position of associated or assigned mobile terminals. For this purpose the mobile terminals are increasingly equipped with functions with the aid of which they are able to determine their geographical position. For example GPS receivers are integrated in the mobile terminals with the aid of which the geographical position can be determined. Other methods are also used e.g. for determining the position of the corresponding mobile terminal by measuring the levels of different transmission stations. All these methods and functions are initiated by means of queries to the respective mobile terminal, or its position/positional information is interrogated. These queries and interrogations are usually performed by a central device in which the location based applications are realized.

SUMMARY OF INVENTION

The queries are accordingly issued continuously, i.e. in a defined time schedule. In order to be able to record the geographical position of mobile terminals that are displaced, and particularly those that are displaced relatively rapidly, continuous queries are necessary at short intervals or within a fairly short time schedule. In particular when it is necessary to query a plurality of mobile terminals, this leads to an increased transmission of information, with the transmission systems and the information-processing components of the central device being subjected to a considerable dynamic load and even being overloaded.

The object underlying the invention is to improve the geographical localization of mobile terminals. This object is achieved by the features of the claims.

A significant advantage of the inventive methods is that the queries to mobile terminals that are either not displaced or displaced slowly can take place at long intervals and thus the wireless transmission systems and the position- and position-information-processing components of a central device are relieved of a considerable dynamic load. This load-reduction effect is reinforced by most terminals being displaced at low speeds. A further advantage of the inventive methods is that the speed of displacement of the mobile terminals is determined and this information can be provided to the location based applications in addition to the position of the terminals. Applications for which this additional information is advantageous include applications that include roaming functions.

Advantageous developments of the inventive methods may be found in the dependent claims.

BRIEF DESCRIPTION OF THE DRAWINGS

The invention is described in more detail below with reference to two appended drawings, in which.

DETAILED DESCRIPTION OF INVENTION

Figure 1:
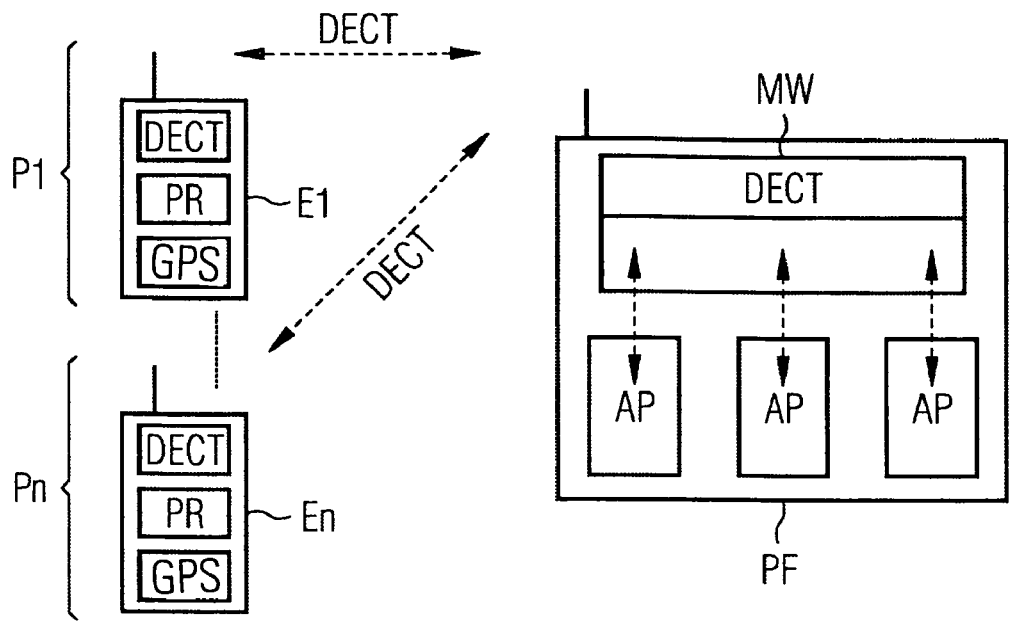
FIG. 1 shows a topology in which the invention is realized.

FIG. 1 shows a communication platform PF in which applications AP for the terminals E1 ... En shown are realized. For the exemplary embodiment it is assumed that the whereabouts or geographical position P1 ... Pn of the terminals E1 ... En and/or of the users of the terminals E1 ... En is to be determined for the applications AP in accordance with the inventive methods. Such applications AP include for example a conference application or an application AP for communication in hotels or an application intended for dealing with emergency situations. The platform PF is embodied for example as a server, with such a server mostly being realized by a computer system or a personal computer.

The terminals E1 ... En are represented in the example by cordless terminals which are embodied in accordance with the DECT standard with regard to radio interface and transmission protocol.

Alternatively other wireless or mobile radio methods are possible in accordance for example with a wireless LAN method or a Bluetooth method or a GPRS method or a UMTS method. The mobile terminals E1 ... En can also be hardwired to the platform through a communication network (not shown), whereby the communication networks can be embodied as packet-based or time-division-multiplex-based (not shown).

In the exemplary embodiment middleware MW is provided in the platform PF for connection of the terminals E1 ... En, by means of which the physical and protocol properties are realized in accordance with the terminals E1 ... En provided. In the terminals E1 ... En conforming to the DECT method according to the exemplary embodiment the physical and protocol DECT interface—indicated in FIG. 1 by the abbreviation DECT—is realized by the middleware MW. The middleware is to be embodied accordingly in the case of other mobile terminals E1 ... En.

For the inventive method it is assumed in the exemplary embodiment that a GPS function GPS (Global Positioning System)—referred to as GPS in FIG. 1—is used in the terminals E1 ... En in order to determine the geographical position P1 ... Pn of same. A GPS receiver is provided for this purpose with the aid of which the position P1 ... Pn of the terminals E1 ... En is determined in accordance with the coordinate system. The position P1 ... Pn of the terminals E1 ... En is unambiguously determined using the positional information pi established by the GPS function GPS.

Alternatively level measurements of the received radio signals—not shown—can be performed in order to determine the position P1 ... Pn of the terminals E1 ... En. The radio signal levels of two radio transmitters are advantageously measured, since the geographical position P1 ... Pn of the terminals E1 ... En can be determined in this way from the known locations of the radio transmitters and the level of the received radio signals. In hardwired mobile terminals E1 ... En the position P1 ... Pn of the mobile terminals E1 ... En can be determined by establishing at which network access point, the position of which is known, the respective mobile terminal E1 ... En is currently connected—not shown in FIG. 1. If the terminal E1 ... En is connected to the platform PF via a communication network, the position P1 ... Pn of said terminal E1 ... En can be determined with the aid of the communication network components such as switching equipment or gatekeepers, for example, and the positional information pi generated in this way can be forwarded to the platform PF, with the communication network components being interrogated by the platform PF for the position P1 ... Pn of the terminals E1 ... En. If the terminals E1 ... En are connected directly to the platform PF the position P1 ... Pn of the terminals E1 ... En is determined by the platform PF itself.

Figure 2:
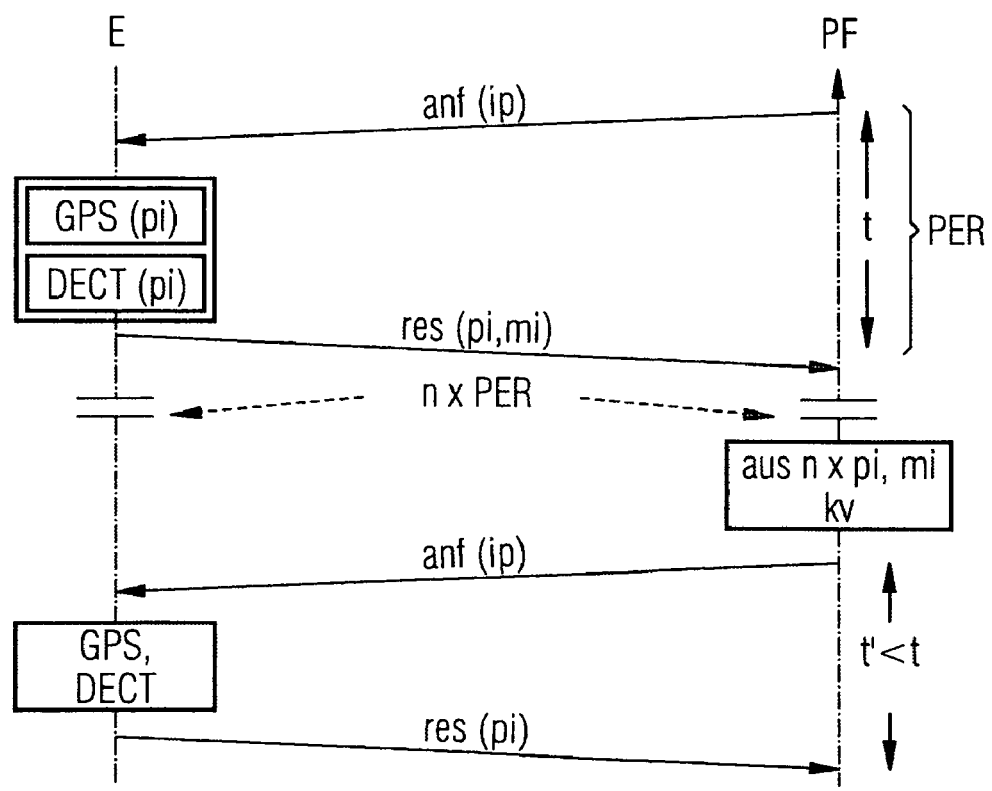
FIG. 2 shows a flow chart explaining the inventive method to accompany the topology realized in FIG. 1.

The inventive method described in FIG. 2 using a flow chart is realized in the middleware MW of the platform PF and in the terminals E1 ... En principally by technical programming means, with a position routine PR being provided for this purpose in the terminals E1 ... En.

In the flow chart shown in FIG. 2 a terminal E and the platform PF are each indicated by a dash-dotted line, with any one of the terminals E1 ... En being represented by the terminal E.

As has already been stated it is necessary for certain applications AP that the current/updated geographical position P1 ... Pn of the mobile terminals E1 ... En is determined. For this purpose a query anf is transmitted by the platform PF to the terminal E concerned, with the query anf containing an item of information ip that shows the terminal E concerned that it is to determine its actual position P1 ... Pn and generate an item of positional information pi. Upon receipt of the query anf in the terminal E concerned the terminal E determines its geographical position P1 ... Pn in accordance with the exemplary embodiment with the aid of the GPS function GPS. The positional information pi determined in this way is transferred/transmitted wirelessly to the platform PF by means of a response res via the DECT function DECT—indicated in FIGS. 1 and 2 by the abbreviation DECT.

The position P1 ... Pn of the terminal E concerned or the terminals E concerned—indicated in FIG. 2 by the abbreviation PER—is determined several times—indicated in FIG. 2 by the abbreviation n×PER, whereby these initial queries anf can be performed at regular i.e. equal intervals t or also irregularly. The speed of displacement kv of the terminal E concerned is determined/calculated using the n transmitted positional information pi in the platform PF. The interval t of the individual queries anf and the positional information pi are incorporated in the calculation. In accordance with the invention, depending on the determined speed of displacement kv of the terminal E concerned the frequency of further queries anf to the mobile terminal E concerned is controlled. This means that at a high speed of displacement kv of the mobile terminal E concerned queries anf to the mobile terminal E are initialized more frequently—i.e. at shorter intervals t'—than at a lower speed of displacement of the mobile terminal E concerned. It is assumed for the purposes of the exemplary embodiment that the mobile terminal E concerned has a low speed of displacement kv and therefore the intervals t' of the subsequent queries anf are larger compared to the initial intervals t—indicated in FIG. 2 by the abbreviation t'<t. Since the speed of displacement kv of the terminal E concerned can be determined again following each query anf the frequency of the queries anf can be adjusted continuously.

In an alternative embodiment of the invention (not shown) the position P1 ... Pn of the terminal E concerned is not determined directly in the terminals E, but instead the radio signal level measurements already described above are performed and the measured levels are transmitted to the platform PF as measured information mi—indicated in FIG. 2 by the abbreviation mi. In the platform both the position P1 ... Pn and the speed of displacement kv of the terminals E concerned are determined/calculated using the transmitted levels, with a distance to the particular radio transmitter being determined from the measured level.

Controlling the frequency of the queries anf is advantageous since particularly at a low speed of displacement kv of the mobile terminals E concerned the frequency of the queries anf can be reduced to a minimum and the communication exchange between the mobile terminals E concerned and the platform PF is thereby significantly reduced. Thus the mobile terminals E and the platform PF are relieved of a considerable dynamic load and consequently the mostly scarce resources in the mobile terminals E and in the platform PF can be used more effectively and/or the resources that become free are available for other uses/applications AP.

The inventive methods are not limited to the exemplary embodiment, but can be employed in all systems in which the recording of the position of the terminals is to be updated in order to influence/control further actions using this updated position as part of applications or functions.

The invention claimed is:

1. A method for localizing a mobile terminal, comprising:
a server sending a query to the mobile terminal, the query prompting the mobile terminal to determine a geographical position of the mobile terminal;
the server receiving position information for the mobile terminal, the position information based on the geographical position of the mobile terminal;
the server determining a speed of displacement of the mobile terminal from the position information; and
the server resending the query at an adjustable frequency, wherein the adjustable frequency is determined as a function of the speed of displacement of the mobile terminal;
wherein the adjustable frequency is increased when the speed of displacement of the mobile terminal increases above a first predetermined amount and the adjustable frequency is reduced when the speed of displacement of the mobile terminal decreases below a second predetermined amount such that an amount of dynamic load on a transmission system and processing components is reduced when the speed of displacement of the mobile terminal is at a predetermined speed.

2. The method of claim 1 further comprising controlling the sending of the query to the mobile terminal and the resending of the query to the mobile terminal with the server, the server being a personal computer or a computer system.

3. The method of claim 1 wherein the server is a central device.

4. The method of claim 1 wherein the adjustable frequency is additionally a function of a position of the mobile terminal.

5. The method of claim 1 wherein the geographical position of the mobile terminal is determined with the aid of a GPS receiver or a GPS function.

6. The method of claim 1 wherein the mobile terminal that is sent the query is a mobile DECT, wireless LAN, UMTS, GPRS, or PDA terminal.

7. A method for localizing a mobile terminal, comprising:
a server sending a query to the mobile terminal, the query prompting the mobile terminal to determine an item of measured information for determining a geographical position of the mobile terminal;

the server receiving the item of measured information;

the server determining a speed of displacement of the mobile terminal from the item of measured information; and the server resending the query at an adjustable frequency, wherein the adjustable frequency of resending the query is determined as a function of the speed of displacement of the mobile terminal;

wherein the adjustable frequency of resending the query is increased when the speed of displacement of the mobile terminal increases above a first predetermined amount and the adjustable frequency of resending the query is reduced when the speed of displacement of the mobile terminal decreases below a second predetermined amount such that an amount of dynamic load on a transmission system and processing components is reduced when the speed of displacement of the mobile terminal is at a predetermined speed.

8. The method of claim 7 further comprising controlling the sending of the query to the mobile terminal and the resending of the query to the mobile terminal with the server, the server being a personal computer or a computer system.

9. The method of claim 8 wherein the server is a central device.

10. The method of claim 7 wherein the adjustable frequency of resending the query is additionally a function of the geographical position of the mobile terminal.

11. The method of claim 7 wherein the item of measured information of the mobile terminal is determined by a measurement of a level of a signal received from at least one sender.

12. The method of claim 7 wherein the mobile terminal is a hardwired mobile terminal in a communication network, and wherein the item of measured information is communication network information that is associated with a connection of the mobile terminal in the communication network.

13. The method of claim 7 wherein the mobile terminal that is sent the query is a mobile DECT, wireless LAN, UMTS, GPRS, or PDA terminal.

14. A communication platform for cooperation with mobile terminals for localizing at least one mobile terminal, comprising:

a transmission unit to send a query to the at least one mobile terminal, the query prompting the at least one mobile terminal to determine a geographical position of the at least one mobile terminal, and the transmission unit is configured to receive position information for the at least one mobile terminal, the position information based on the geographical position of the at least one mobile terminal; and wherein the at least one mobile terminal has a speed of displacement that is determined by the communication platform from the position information that is received by the transmission unit; and wherein the query is resent to the at least one mobile terminal at an adjustable frequency that is a function of the speed of displacement of the at least one mobile terminal;

wherein the adjustable frequency of resending the query is increased when the speed of displacement of the mobile terminal increases above a first predetermined amount and the adjustable frequency of resending the query is reduced when the speed of displacement of the mobile terminal decreases below a second predetermined amount such that an amount of dynamic load on the transmission unit is reduced when the speed of displacement of the mobile terminal is at a predetermined speed.

15. A communication platform for cooperation with mobile terminals for localizing at least one mobile terminal, comprising:

a transmission unit to send a query to the at least one mobile terminal, the query prompting the at least one mobile terminal to determine an item of measured information for determining a geographical position of the at least one mobile terminal, and the transmission unit is configured to receive the item of measured information; and wherein the at least one mobile terminal has a speed of displacement that is determined by the communication platform from the item of measured information that is received by the transmission unit; and wherein the query is resent to the at least one mobile terminal at an adjustable frequency that is a function of the speed of displacement of the at least one mobile terminal;

wherein the adjustable frequency of resending the query is increased when the speed of displacement of the mobile terminal increases above a first predetermined amount and the adjustable frequency of resending the query is reduced when the speed of displacement of the mobile terminal decreases below a second predetermined amount such that an amount of dynamic load on the transmission unit is reduced when the speed of displacement of the mobile terminal is at a predetermined speed.

16. The communication platform of claim 14 wherein the communication platform is a computer, a computer system or a server.

17. The communication platform of claim 14 wherein the adjustable frequency at which the query is resent to the at least one mobile terminal is additionally a function of the geographical position of the at least one mobile terminal.

18. The communication platform of claim 15 wherein the item of measured information of the at least one mobile terminal is determined by a measurement of a level of a signal received from at least one sender.

19. The communication platform of claim 15 wherein the communication platform is a computer, a computer system or a server.

20. The communication platform of claim 15 wherein the at least one mobile terminal is a hardwired mobile terminal in a communication network, and wherein the item of measured information is communication network information that is associated with a connection of the at least one mobile terminal in the communication network.

\* \* \* \* \*